United States Patent [19]

Panse

[11] Patent Number: 4,644,254
[45] Date of Patent: Feb. 17, 1987

[54] SWITCH CONTROLLER HAVING A REGULATING PATH AND AN AUXILIARY REGULATING PATH PARALLEL THERETO

[75] Inventor: Hubert Panse, Munich, Fed. Rep. of Germany

[73] Assignee: Siemens Aktiengesellschaft, Berlin & Munich, Fed. Rep. of Germany

[21] Appl. No.: 757,443

[22] Filed: Jul. 22, 1985

[30] Foreign Application Priority Data

Aug. 28, 1984 [DE] Fed. Rep. of Germany ....... 3431613

[51] Int. Cl.$^4$ .................................................. G05F 1/40
[52] U.S. Cl. ......................................... 323/282; 363/89
[58] Field of Search ............................. 363/47, 48, 89; 333/181; 323/282–290

[56] References Cited

U.S. PATENT DOCUMENTS

| | | | |
|---|---|---|---|
| 3,226,630 | 12/1965 | Lampke | 363/47 X |
| 4,293,904 | 10/1981 | Brooks et al. | 323/282 X |
| 4,454,558 | 6/1984 | Huddart | 323/282 X |
| 4,514,679 | 4/1985 | Schierjott | 323/285 X |

FOREIGN PATENT DOCUMENTS

WO84/00085 1/1984 European Pat. Off. .
2032148 4/1980 United Kingdom ................. 323/286
964610 10/1982 U.S.S.R. ............................. 323/286

OTHER PUBLICATIONS

Hewlett Packard Application Bulletin 33, "Loop Phase-Gain Measurement of a Power MOSFET Switch Mode Power Supply".
IBM Technical Disclosure Bulletin, vol. 20, No. 8, Jan. 1978, pp. 2945–2947.

Primary Examiner—Patrick R. Salce
Assistant Examiner—Marc S. Hoff
Attorney, Agent, or Firm—Hill, Van Santen, Steadman & Simpson

[57] ABSTRACT

A switch controller has a regulating path formed of an inductance and a smoothing capacitor. A DC potential at the smoothing capacitor is connected to an amplifier which serves for amplifying a difference between this DC potential and a prescribed reference potential. A following pulse-width modulator for the control of a switching transistor is connected to the amplifier. In accordance with the invention, an auxiliary regulating path is connected parallel to the regulating path. The auxiliary regulating path is designed such that it has a maximum phase rotation of −90° in its phase response.

6 Claims, 2 Drawing Figures

SWITCH CONTROLLER HAVING A REGULATING PATH AND AN AUXILIARY REGULATING PATH PARALLEL THERETO

BACKGROUND OF THE INVENTION

The invention relates to a switch controller or regulating switch for regulating a dc output voltage. The switch controller has a regulating path formed of an inductance and a smoothing capacitor. A dc potential is obtainable at the smoothing capacitor. This dc potential is provided at one input of an amplifier which serves for amplifying a difference between this dc potential and a prescribed reference voltage. A pulse-width modulator controls a switching transistor of the switch controller.

Switch controllers (also known as regulating switches) are notoriously known in power supplies for generating a constant output voltage. A regulating path formed of an inductance and of a capacitor is directly charged in pulse-like fashion with a current by a switching transistor (secondary switch controller), or is charged with a current via a transformer and a rectifier diode (flow converter). The regulating path serves for smoothing the voltage applied in pulse-like fashion. A control loop contains a regulating path, including an amplifier for amplifying the difference between the voltage output by the secondary switch controller and a prescribed reference voltage. It further contains a switching transistor and a pulse-width modulator for controlling the pulse-duty factor of the switching transistor. The output voltage is thus controlled to a constant value. A transformer does not change the phase relation but only the voltage and current ratios.

The regulating path formed of the inductance and of the capacitor represents a delay circuit of the second order for the DC voltage modulated by the non-steady final control element, i.e. by the switching transistor. When an extremely slight ripple of the output voltage is required in the switching frequency range, then this delay must have a very high attenuation. A lower resonant frequency of this arrangement thus results which comes close to the noise frequency of the line ac. Given employment of proportional regulators in the control loop, the resonant frequency of the closed control loop is in the proximity of the resonant frequency of the regulating path, because the phase rotation of the closed loop is less than 180° here. Given the resonant frequency of the closed control loop, the loop gain is equal to 1. Due to stability reasons, the loop gain in the noise frequency range, i.e. in the proximity of the resonant frequency of the regulating path, is extremely limited and the disturbance, i.e. the rectified line ac, is only incompletely leveled.

The use of controllers with differential components in the control loop for increasing the loop gain in the noise frequency range is only possible to a very limited degree given switched power supplies, since among other things, they also amplify disturbances resulting from switching events such that the functional reliability is not guaranteed.

The use of steady regulators is known for regulating the output voltage of switched power supplies. These have a very low efficiency. The use of complex control loop structures is also known for regulation such as, for example, an underlying current regulation. This has the disadvantage that an increased component expense is necessary for the current measurement and the current regulator. It is likewise known to reduce the disturbance for a regulated output voltage by means of increased expense for filtering the line voltage ripple.

SUMMARY OF THE INVENTION

An object of the invention is to specify a regulating path for a switch controller which also levels low-frequency disturbances, for example disturbances deriving from the line ac.

This object is achieved by providing an auxiliary regulating path connected in parallel to the main regulating path. The auxiliary regulating path has means for effecting a maximum phase rotation of −90° in its phase response.

For power supplies with switch controllers, the invention solves the problem of a large phase rotation in the regulating path in the natural frequency range of the control loop. For this purpose, from the point of view of the regulator, an auxiliary regulating path is connected parallel to the regulating path, this auxiliary regulating path having a slight phase rotation of for example −90° in the desired frequency range. The gain can thus be increased without endangering the stability.

A particular disturbance, for example line voltage ripple, is leveled significantly better by means of the gain boost. In addition to the low pass filter of the first order for the phase rotation of −90°, the auxiliary regulating path also has a high pass filter behavior so that the stationary output variable of the regulating path remains uninfluenced.

DESCRIPTION OF THE PREFERRED EMBODIMENTS

The figure shows a known secondary switch controller comprising a switching transistor T. An unregulated DC voltage generated via a rectifier arrangement G from an input ac voltage UE and smoothed by a capacitor C1 is present at the collector of the switching transistor T. The input alternating voltage UE is connected to input terminals E1, E2. The unregulated DC and an output DC UA are referenced to a reference potential OV. The emitter of the switching transistor T which is connected via a free-wheeling diode D to the reference potential OV is connected via a regulating path RS to an output terminal A1. The regulating path RS is composed of an inductance L and of a capacitor C2. The output DC voltage UA can be obtained at output terminals A1, A2, whereby the output terminal A2 is connected to the reference potential OV. The output terminal A1 is connected via resistor R1 to an input of an amplifier at whose other input a reference voltage UR is present. The output of the amplifier is connected to the DC voltage input of a pulse-width modulator P. The output of the pulse-width modulator P is connected to the base of the switching transistor T.

An auxiliary regulating path HS is provided in accordance with the invention. The idea underlying the invention is that an auxiliary regulating path HS is connected parallel to the regulating path RS, this auxiliary regulating path HS having a slight or minimal phase rotation in the desired frequency range, i.e. for example a phase rotation of a maximum of −90°. The gain in the control loop can thus also be increased without deteriorating the stability.

The auxiliary regulating path HS is formed of a delay circuit of the first order, i.e. a series connection of a resistor R2 and a capacitor C4 connected between the emitter of the switching transistor T and the reference potential OV. The circuit point (not referenced in detail) between the resistor R2 and the capacitor C4 is likewise connected to the one input of the amplifier V. It is connected thereto via a further capacitor C3, which serves for DC voltage separation, and also via a resistor R3.

In accordance with the invention, the delay, i.e. the product of the resistor R2 and the capacitor C4 of the auxiliary regulating path HS, is dimensioned such that the reciprocal value is roughly equal to the resonant frequency of the regulating path RS. Given the parallel connection of the regulating path RS and of the auxiliary regulating path HS, the frequency response of the auxiliary regulating path HS predominates toward high frequencies. Thus, a maximum phase rotation of $-90°$ is guaranteed at high frequencies. Consequently, the tendency of the control loop to oscillate is avoided. The frequency response of the regulating path RS thus predominates in the direction of low frequencies. The capacitor C3 thus serves for decoupling the one input of the amplifier V from the DC potential at the emitter of the switching transistor T.

Figure 1:
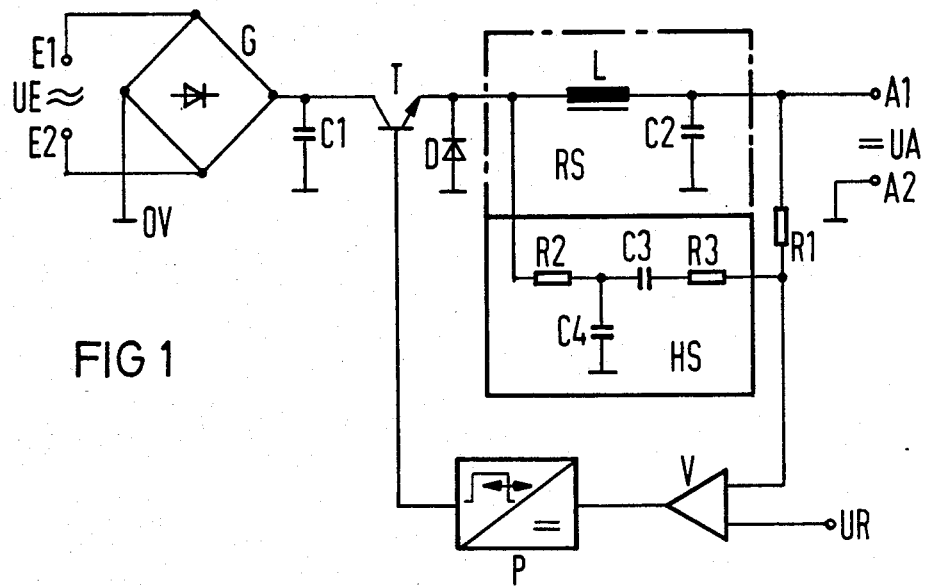
FIG. 1 is a circuit diagram of a secondary switch controller employing the invention.
Figure 2:
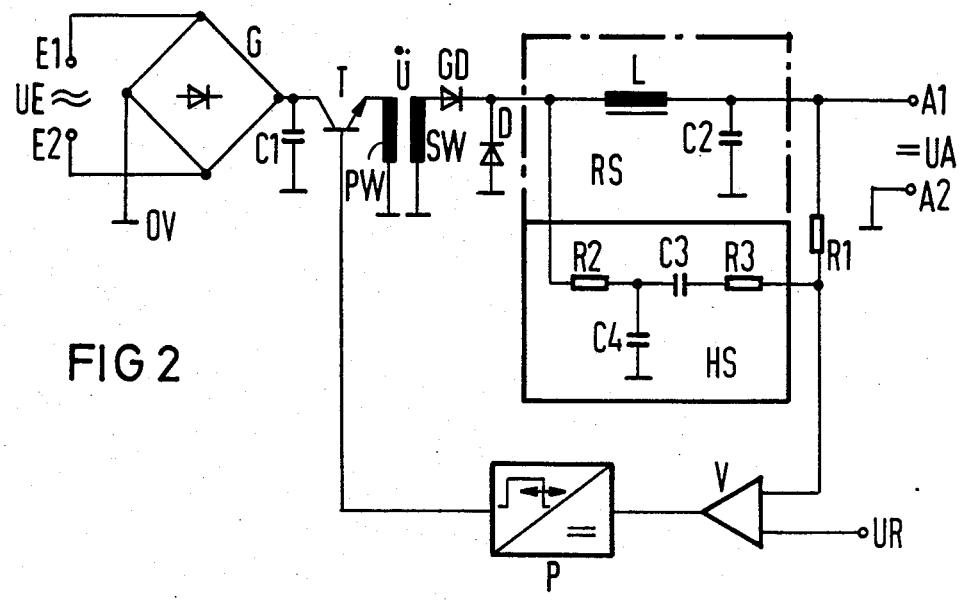
FIG. 2 shows a flow converter employing the invention.

The invention can also be applied given primary connected switch controllers. As shown in FIG. 2, a transformer U having primary and secondary windings PW, SW, and a rectifier diode GD, are inserted between the switching transistor T and the diode D or between the transistor T and the inductance L. The diode D is the free-wheeling diode which is necessary. The two windings PW, SW have their free ends respectively connected to the reference potential OV.

With the invention, the parallel connection of an auxiliary regulating path having a maximum phase rotation of $-90°$ to a regulating path RS can be applied to all flow switch controllers which are primarily or secondarily clocked.

Although various minor changes and modifications might be proposed by those skilled in the art, it will be understood that I wish to include within the claims of the patent warranted hereon all such changes and modifications as reasonably come within my contribution to the art.

I claim as my invention:

1. A switch controller for regulating a DC output voltage, comprising:
    switching means including a switching transistor feeding a regulating path formed of an inductance and smoothing capacitor;
    a DC potential at the smoothing capacitor being connected to one input of an amplifier means for amplifying a difference between said DC potential and a prescribed reference voltage at another input;
    pulse-width modulator means connected to an output of the amplifier means having an output connected to control the switching transistor;
    an auxiliary regulating path connected in parallel to said regulating path and which has both a low pass filter and a high pass filter; and
    said auxiliary regulating path having means for effecting a maximum phase rotation of $-90°$ in its phase response.

2. A switch controller according to claim 1 wherein the auxiliary regulating path is formed of a series connection of a resistor and a capacitor, a voltage potential at a voltage dividing point lying therebetween being connected to the amplifier means.

3. A switch controller for regulating a DC output voltage, comprising:
    switching means including a switching transistor feeding a regulating path formed of an inductance and smoothing capacitor;
    a DC potential at the smoothing capacitor being connected to one input of an amplifier means for amplifying a difference between said DC potential and a prescribed reference voltage at another input;
    pulse-width modulator means connected to an output of the amplifier means having an output connected to control the switching transistor;
    an auxiliary regulating path connected in parallel to said regulating path;
    said auxiliary regulating path having means for effecting a maximum phase rotation of $-90°$ in its phase response;
    the auxiliary regulating path being formed of a series connection of a resistor and a capacitor, a voltage potential at a voltage dividing point lying therebetween being connected to the amplifier means; and
    the voltage potential at said voltage dividing point being connected to a further capacitor for DC separation from the following connected amplifier means.

4. A switch controller according to claim 3 wherein the DC potential is connected to the amplifier means via a resistor, and the further capacitor is connected to the amplifier means via a resistor.

5. A switch controller for regulating a DC output voltage, comprising:
    switching means including a switching transistor feeding a regulating path formed of an inductance and smoothing capacitor;
    a DC potential at the smoothing capacitor being connected to one input of an amplifier means for amplifying a difference between said DC potential and a prescribed reference voltage at another input;
    a pulse-width modulator means connected to an output of the amplifier means for control of the switching transistor;
    an auxiliary regulating path connected in parallel to said regulating path and which has both a low pass filter and a high pass filter; and
    said auxiliary regulating path having means providing a frequency response predominating toward high frequencies such that a maximum phase rotation of $-90°$ occurs at said high frequencies, and a frequency response of the regulating path predominating at relatively low frequencies, whereby undesired oscillation via the regulating path is avoided.

6. A switch controller for regulating a DC output voltage, comprising:
    switching means including a switching transistor feeding a regulating path formed of an inductance and smoothing capacitor;
    a DC potential at the smoothing capacitor being connected to one input of an amplifier means for amplifying a difference between said DC potential and a prescribed reference voltage at another input;
    a pulse-width modulator means connected to an output of the amplifier means for control of the switching transistor;

an auxiliary regulating path connected in parallel to said regulating path;

said auxiliary regulating path having means providing a frequency response predominating toward high frequencies such that a maximum phase rotation of −90° occurs at said high frequencies, and a frequency response of the regulating path predominating at relatively low frequencies, whereby undesired oscillation via the regulating path is avoided; and the auxiliary regulating path being formed of a delay circuit including a resistor and capacitor, and wherein a product of values of the resistor and capacitor are dimensioned such that a reciprocal value thereof is approximately equal to a resonant frequency of the regulating path.

* * * * *